United States Patent
Steneby (10) Patent No.: US 7,295,372 B2
(45) Date of Patent: Nov. 13, 2007

(54) DAY LIGHTING DEVICE (75) Inventor: Bengt Steneby, Partille (SE)

(73) Assignee: Parans Daylight A.B., Gothenburg (SE)

( * ) Notice: Subject to any disclaimer, the term of this patent is extended or adjusted under 35 U.S.C. 154(b) by 308 days.

(21) Appl. No.: 10/512,564

(22) PCT Filed: Apr. 24, 2003

(86) PCT No.: PCT/SE03/00662

§ 371 (c)(1),
(2), (4) Date: Apr. 27, 2005

(87) PCT Pub. No.: WO03/091621

PCT Pub. Date: Nov. 6, 2003

(65) Prior Publication Data

US 2005/0224074 A1    Oct. 13, 2005

(30) Foreign Application Priority Data

Apr. 24, 2002  (SE) .................................... 0201229

(51) Int. Cl.
*G02B 27/00* (2006.01)
(52) U.S. Cl. .................. 359/592; 359/593; 126/698
(58) Field of Classification Search .............. 359/591, 359/592, 593; 126/698, 700
See application file for complete search history.

(56) References Cited

U.S. PATENT DOCUMENTS 3,213,285 A    10/1965  McCusker
3,594,070 A *  7/1971  Whitehead .............. 359/593
4,050,789 A    9/1977  Herbert
4,274,394 A    6/1981  Stromberg
4,445,498 A    5/1984  Mori
4,723,826 A    2/1988  Whitaker
4,867,514 A    9/1989  Waldron
5,039,352 A    8/1991  Mueller et al.

FOREIGN PATENT DOCUMENTS

JP    59-160214 A    9/1984

\* cited by examiner

*Primary Examiner*—Christopher Mahoney
(74) *Attorney, Agent, or Firm*—Harness, Dickey & Pierce

(57) ABSTRACT

The present invention relates to an apparatus for collecting and transmitting sunlight into a space comprising a solar ray collecting device, a solar light transmitting device and a solar light emitting device, wherein said solar ray collecting device is arranged to collect sunlight and direct said sunlight to said solar light transmitting device, said solar ray transmitting device is arranged to transmit said sunlight from said solar ray collecting device into said space and to said solar light emitting device, and said solar light emitting device is arranged to emit solar light in said space. Said solar ray collecting device comprises at least one convex lens and at least one concave lens, and at least said convex lens or said concave lens is arranged to be movable in dependence of the angle of incident solar light so as to focus the solar light onto said solar light transmitting means through said convex and concave lens.

16 Claims, 10 Drawing Sheets

DAY LIGHTING DEVICE

TECHNICAL FIELD

The present invention relates to collecting sunlight and transporting said sunlight into a space. More specifically, the present invention relates to an automatic sun tracking device and lens arrangement for collection of sunlight for the purpose of illumination.

BACKGROUND OF THE INVENTION

To be able to introduce day light into a building has in all times been of great interest. The human being has in all times, apart from the modern era with electric light, been dependent on the daylight and has biologically evolved under this constraint. The turning of the sun during the day, from east to west, has a significant effect on peoples perception of passed time, when to have different types of meals, when to sleep and when to get up, just to mention a few.

When designing buildings the introduction of daylight, in later times particularly through glass windows, is a major design consideration. At the same time, as land prices raise in popular areas, it is of economical interest to build bigger buildings. These two requirements are at times colliding. Residential blocks are most often not wider than 9-10 meters. However, the wider buildings lack significant daylight comfort. They tend to be somewhat like darker caves. A daylight source using a daylight collector makes it possible to construct buildings with higher utilization factor.

U.S. Pat. No. 5,022,736 "Solar ray device for illumination" discloses a device comprising a solar ray collecting device having multiple optical lenses, and an illuminator connected through a plurality of light guiding cables. The device further comprises a sensor for detecting the direction of the sun's rays and for treating a control signal causing the optical lenses to be directed toward the sun.

U.S. Pat. No. 4,297,000 "Solar lighting system" disclose a solar collector device for directing solar light onto a bundle of optical fibres. The device comprises a tracking system to direct to collector device towards the sun.

JP 591,602,14 "Solar light tracking device" disclose a solar tracking device for tracking to sun using a spring of a shape memory alloy.

U.S. Pat. No. 4,050,789 "Tracking lens system for solar collectors and skylights" disclose an arrangement for collecting solar light using three layers of lenses, a first condensing lens, a second diverging lens and a third condensing lens. More over the second lens need to be positioned not only horizontally between the two condensing lenses but also vertically to focus the beam correctly. These limitations require that sophisticated and expensive mechanism for moving the middle lens. It would be beneficial if fewer lenses could be used and if a movement in only two dimensions could be achieved.

U.S. Pat. No. 4,867,514 "Systems for deviating and (optionally) converging radiation" disclose a method for collecting solar light comprising first lens and second lenses. The second lens need to be movable in direction to and from said first lens to increase or decrease the distance from the first lens as well as parallel to the first lens to collect the sun light. It would be beneficial if a movement in the direction to and from the first lens could be avoided to achieve a simpler and more cost effective solar collecting device.

SUMMARY OF THE INVENTION

It is a main object of the present invention to provide such apparatus and method that collects solar light in an efficient manner for transmission into a space such as a building, a ship, a road tunnel, a cave, a mine, a spacecraft or the like.

It is a specific object of the present invention to provide an apparatus and a method for collecting direct sunlight while allowing ambient sunlight into a building.

It is in this respect a particular object of the invention to provide such apparatus and method that follows the movement of the sun over the sky using a low cost device comprising e.g. a memory alloy.

These objects among others are, according to a first aspect of the present invention, attained by a panel for mounting on a building comprising a solar ray-collecting device. The solar ray collecting device is arranged to collect a substantial part of the direct sunlight falling on said panel and direct said collected sunlight on a light transportation means or a light transformation means. The panel is further arranged to be substantially transparent to a substantial part of the indirect, or ambient, light so that said panel, when mounted on a building, allows ambient light into said building and collects direct sun light falling on said panel.

By collecting the direct sunlight it can be transported to other parts of the building, or focused on a light-to-electricity converter. By collecting the direct sunlight it is also prevented to enter a room. The panel is thus functioning as a curtain or shader. The panel further more allows ambient sunlight into the room, which thus is lit with a comfortable light, without the strong, direct sunlight.

According to a preferred embodiment of the first aspect of the invention the light transportation means is a light conducting fiber and/or the light transformation means is a light to electricity conversion means e.g. a fotodiod.

The panel comprises, in light propagation direction, a transparent top side and a transparent bottom side connected at the sides to form a box, said box encloses a lens arrangement for collecting direct sun light.

The box is thus substantially transparent to ambient sunlight but collects, through the lens arrangement in the box, direct sunlight.

These objects among others are, according to a second aspect of the present invention, attained by an apparatus for collecting sunlight having a solar ray collecting device, comprising a first set of lenses arranged in arrays side by side to form a first sheet of lenses and a second set of lenses arranged in arrays side by side to form a second sheet of lenses. The apparatus further comprises means for moving said first and second sheet of lenses in relation to each other only along a substantially flat plane so that the distance between said first and second sheet is kept constant.

Movement along a substantially flat surface of the two lens sheets is particularly easy to achieve. Thus, the means for moving the sheets in relation to each other to follow the sun's movement and collect direct sunlight may be a comparable simple design, which is cost effective, tolerant and will not require high maintenance.

According to a preferred embodiment of the first and second aspect of the present invention the lens arrangement comprises, in light propagating direction, first lenses arranged side by side having first substantially planar surfaces and second convex surfaces and second lenses arranged side by side having third concave surfaces and fourth substantially flat surfaces so that direct sun light passes first, second, third and fourth surfaces in said order.

The first and second lenses are displaceable in relation to each other in at least a first direction, but preferably in two orthogonal directions.

The design according to the invention assures a linearity of the movements in the system. This means that for every change in the angle of the incident light, within the angles that permit solar tracking, corresponds a proportional parallel movement of one sheet of lenses in respect to the other in order to maintain the position of the focal point in its intended position.

According to another preferred embodiment of the invention the apparatus for collecting and transmitting sunlight into a space comprising a solar light transmitting device and a solar light emitting device, wherein said solar ray collecting device is arranged to collect sunlight and direct said sunlight to said solar light transmitting device, said solar ray transmitting device is arranged to transmit said sunlight from said solar ray collecting device into said space and to said solar light emitting device, and said solar light emitting device is arranged to emit solar light in said space. At least one of said first and/or second sheet is arranged to be movable in dependence of the angle of incident solar light so as to focus the solar light onto said solar light transmitting means through said convex and concave lens.

Thereby the collected sunlight can be used to lit a room inside a building.

According to another preferred embodiment of the invention the apparatus comprises a displacing device wherein said displacing device comprises solar ray sensitive means arranged to detect the position of the sun in the sky and actuating means arranged to move said convex and/or concave lens in dependence of the detected sun position.

These objects among others are, according to a third aspect of the present invention, attained by a mechanical displacing device for moving an object, such as a lens, in dependence of the sun's position in the sky. The device comprises a solar ray shield having at least one aperture, at least a first solar ray sensitive tongue, such as a bi-metal or memory alloy tongue, arranged at least partly under said at least one aperture in the direction of incident solar rays, and an actuator rod coupled to said solar ray sensitive tongue and arranged to displace said solar ray shield and/or said solar ray sensitive tongue in relation to each other in dependence of the incident angle of solar rays.

Thereby an effective, simple and low-cost device for moving the lenses according to the sun's position in the sky, to collect direct sunlight is achieved.

These objects among others are, according to a fourth aspect of the present invention, attained by a method for allowing light into a building including a solar ray collecting device, comprising the steps of, mounting a panel having a substantially transparent outer surface and a substantially transparent inner surface on said building, collecting a substantial part of the direct sun light falling on said panel and directing said collected sun light on a light transportation means or a light transformation means, and allowing a substantial part of the indirect, or ambient, light to pass through said panel so that said panel, when mounted on a building, allows ambient light into said building and collects direct sun light falling on said panel.

The invention can in general terms be described according to a preferred embodiment as a tracking lens system for dividing/separating direct and ambient (indirect) sunlight. The direct sunlight is focused by a system of lenses, while the ambient (indirect) sunlight passes the embodiment on the invention. The tracking lens system is suitable fog modification of incident radiation, e.g. solar radiation. The modification of said radiation is accomplished by having it pass two layers of optical devises. The main purpose is to produce a converging radiation in the spectrum of visible light from incident, substantially parallel sunlight where the converging radiation can be focused upon a collecting means This modification is possible for radiation, incident from different angles in respect to the lenses, which is necessary to track the sun if the system is to be installed in a fix position on for example a building.

The object of the invention is to provide a system for tracking, collecting and modifying solar radiation. The principle is built upon a pair of lenses but can be expanded to include an array of lenses mounted for example in a panel. There are several possible applications of the invention. An example is when combined with a transporting means such as optical fibres. Then the system as a whole will enable collection of solar radiation as the sun passes from east to west and further transportation of said solar radiation to any chosen locations. Another example is to focus the sunlight on photoelectric elements for transformation of solar energy into electrical energy, either with said photoelectric elements in each focal point of the system or with a photoelectric element placed in the focal point of a multiple of said optical fibres, thus achieving a great concentration of the sunlight Replacing these photoelectric elements with heat-conducting or heat-collecting elements, placed analogue as above said photoelectric elements results in yet another application, namely that of converting the solar energy into usable heat-energy.

The curvature of the plane-convex lens is designed to avoid total internal reflection within the invention's operating range.

The innovation can be scaled to generate focal point of different sizes. This can be useful for matching the size of an attached element, be it an optical fibre, a photoelectric elements or other element. For instance, photoelectrical elements may have an optimal size regarding performance. The size of the focal point may thus be scaled to coincide with the size of the photoelectrical element.

The pair of lenses can be designed so that a prismatic shape is superpositioned either on the first convex lens or on the second concave lens or on both the first convex lens and on the second concave lens. The purpose of this is to produce a system with a greater operating range in either direction off from the normal axle, which is perpendicular to the pair of lenses and thus aiming the axle of the lens pair more in the direction of the incident, substantially parallel sunlight.

An advantage of the present invention is that a low cost device having excellent capabilities to collect sunlight is achieved. The device and method according to an embodiment of the present invention does more over not comprise any expensive computerized parts which may need service.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1-16, which are given by way of illustration only, and thus are not limitative of the present invention.

FIG. 13 shows a schematic side view of a preferred embodiment according to the first aspect of the present invention, where direct sunlight is collected into a light transportation means and ambient sunlight is allowed to pass through.

PARTICULAR EMBODIMENTS OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1A:
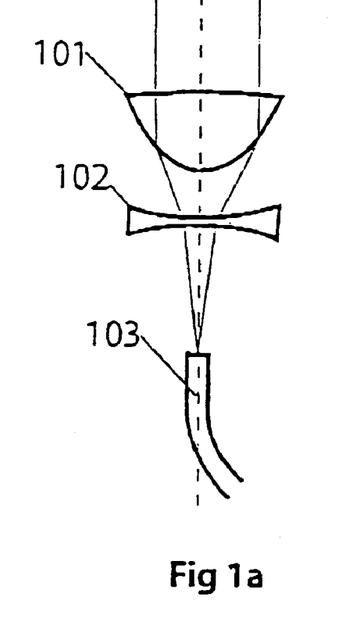
FIGS. 1a and 1b schematically shows a lens arrangement according to an embodiment of the invention in two different positions according to the sun's position in the sky.
Figure 1B:
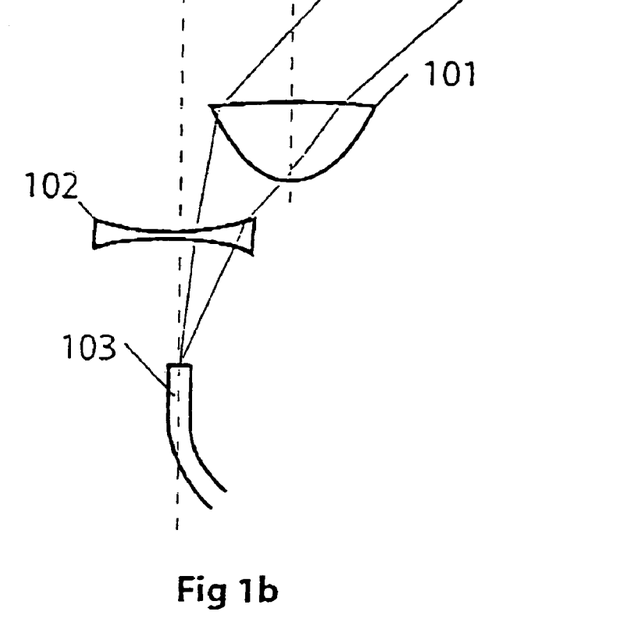

FIGS. 1a and 1b shows a lens arrangement according to an embodiment of the invention. A convex lens 101 is positioned above a concave lens 102 in the line of incident light. The convex lens 101 and the concave lens 10 cooperates to focus the incident sun light onto a light carrying media such as an optical fibre 103 for further guiding into a house. FIG. 1a shows the lens arrangement when the sun is at its peek position in the sky. In FIG. 1b the sun's position in the sky has changed and the sunlight has an angle in relation to the lens arrangement. To focus the light onto the optical fibre 103 the convex lens 101 is displaced as can be seen in FIG. 1b.

Figure 2:
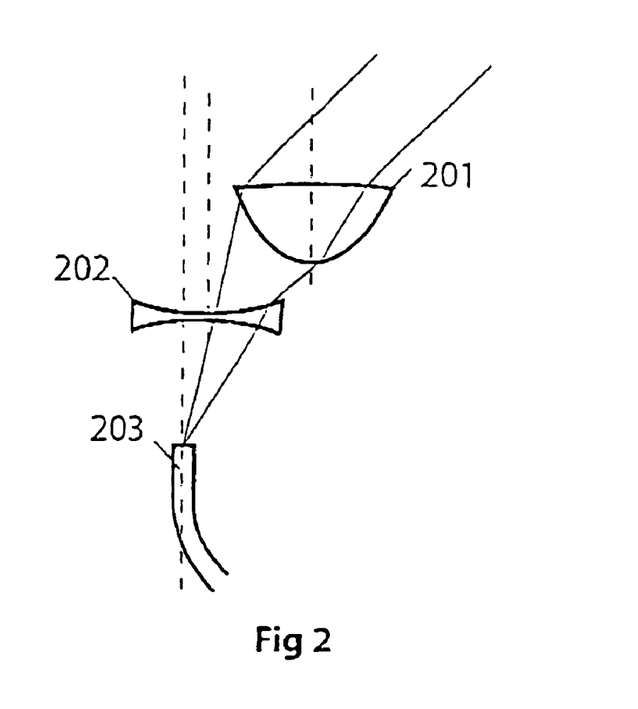
FIG. 2 schematically shows a lens arrangement according to an embodiment of the invention.

FIG. 2 shows another embodiment of the lens arrangement. A convex lens 201 is arranged above a concave lens 202 and both of said lenses 201 and 202 cooperates to focus the incident light onto an optical fibre 203. In this embodiment both of the convex lens 201 and the concave lens 202 is displaced in relation to the optical fibre 203 when the sun's position in the sky changes to continue to focus as much light as possible onto the optical fibre 203.

Figure 3:
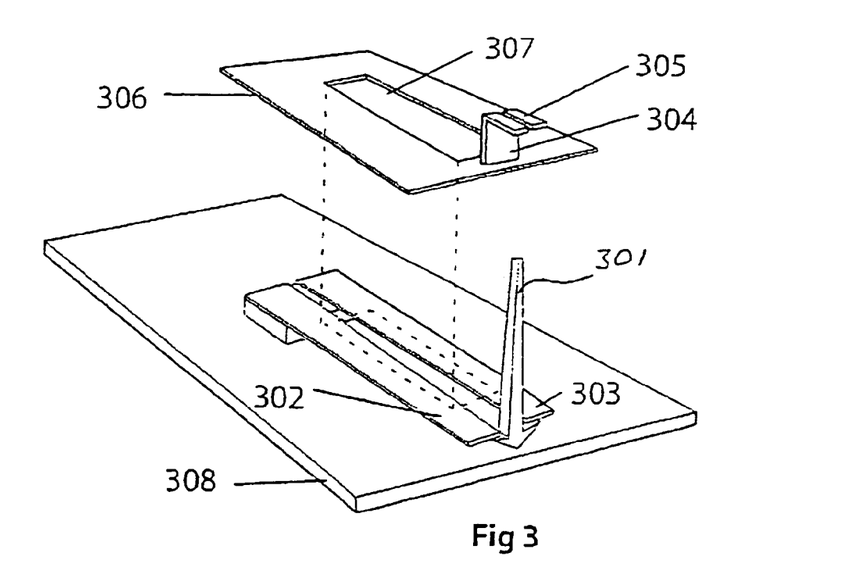
FIG. 3 shows a perspective view of a lens arrangement displacer according to an embodiment of the invention.

FIG. 3 shows a blown perspective view of a displacer arrangement for use with the lens arrangement in FIGS. 1 and 2. A lever 301 engages with a first and second solar ray sensitive tongue denoted 302 and 303, respectively. The lever 301 also engages a pole 304 having engaging means 305. The pole 304 is arranged on a solar ray shield 306 having an aperture or window 307. As stated above, the first and second tongue 302 and 303 respectively is in a first end engaging said lever 301 and is in the other end fixed to a bottom plate 308. The solar ray shield 306 is movably secured to the bottom plate 308 so that it is displaceable in at least one direction.

The solar ray shield is arranged so that solar light passing through said window 307 will fall upon the first and second tongue 302 and 303, respectively. In dependence of the sun's position in the sky different parts of the tongues 302 and 303 will be reached by the incident light. The tongues 302 and 303 are of a solar ray sensitive material for instance a heat sensitive metal such as a memory alloy or a bimetal and is arranged to bend in vertical direction in dependence of the amount of sunlight reaching respective tongue. When the respective tongue moves up or down they will engage the lever 301 which in turn will engage the pole 304 and displace the shield 306. Thus the shield will be displaced in dependence of the sun's position in the sky. This will he further explained below with reference to FIG. 4.

Figure 4A:
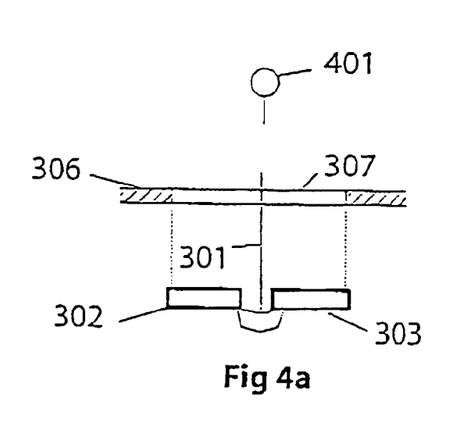
FIGS. 4a to 4c schematically shows the displacer in FIG. 3 in different positions.
Figure 4B:
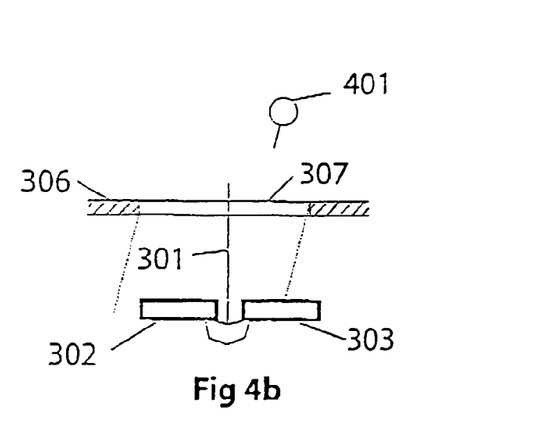
Figure 4C:
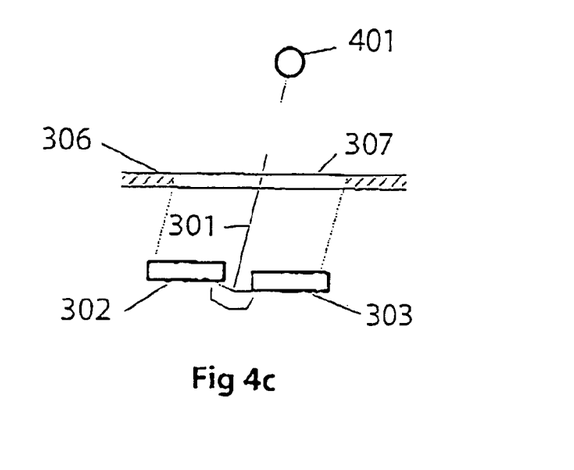

FIGS. 4a to 4c shows in a front view the principles behind the movement of the sunray shield 306 in FIG. 3. The sun's position in the sky and the angle of incident light is schematically shown and is denoted 401. In FIG. 4a the sun is in its peek position and the sunrays is failing straight through the window 307 at the tongues 302 and 303, respectively. In FIG. 4b the sun has moved over the sky and the rays are not longer falling in straight through the window 307 but rather with a slight angle. This means that the projection of the window has moved over the tongues 302 and 303, respectively as can be seen in FIG. 4b. Thus tongue 302 gets warmer and tongue 303 cools off, which in turn results in that the tongue 302 bends slightly upwards and tongue 303 bends slightly downwards as can be seen in FIG. 4c. The tongues engage the lever 301 and tilt the lever, which in turn engages the shield 305 and moves the shield 306. Thus the window 307 is moved and the projection of the window 307 on the tongues 302 and 303 is moved until equilibrium is achieved.

The sun's position in the sky depends in one direction, namely east west, of the time of the day and in another direction, namely height over the horizon, of the day of the year. This latter direction is specifically accentuated the farther from the equator the sun collector is positioned. To also consider the sun's height over the horizon the displacer previously discussed need to be modified to be able to displace the lens arrangement in two dimensions. The principles remain, however the same.

Figure 5A:
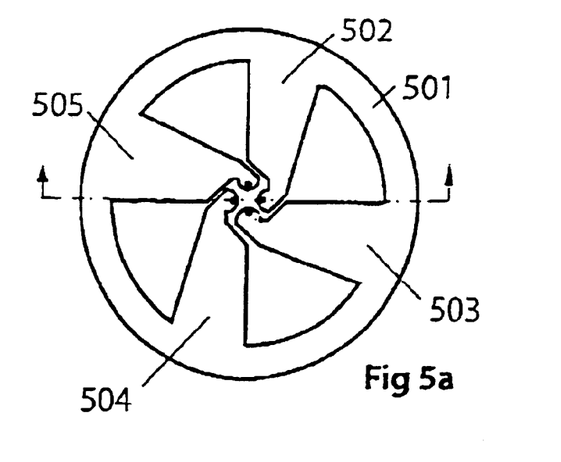
FIGS. 5a and 5b shows a top view of a displacer arrangement for moving a lens arrangement in two dimensions.
Figure 5B:
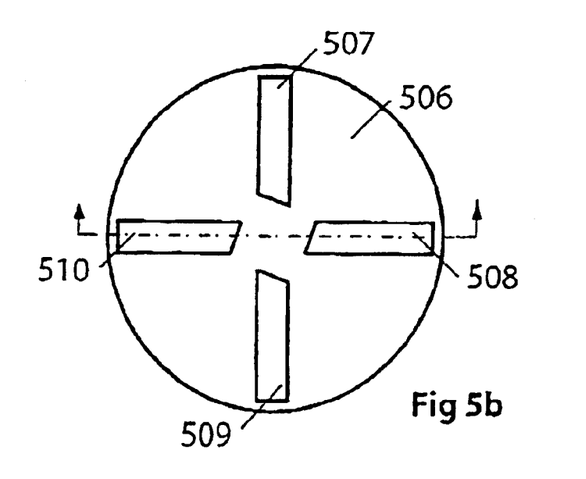

FIGS. 5a and 5b shows a two dimensional displacer according to an embodiment of the invention. FIG. 5a shows, in a top view, a disc 501 having four solar ray sensitive, e.g. heat sensitive, tongues denoted 502, 503, 504, 505, respectively. The tongues are arranged to bend up or down depending on the amount of sunlight reaching each tongue. FIG. 5b shows a top view of a solar ray shield 506 having four apertures or windows denoted 507, 508, 509, 510, respectively. The shield 506 is to be arranged above the disc 501 as can be seen in FIG. 6.

Figure 6:
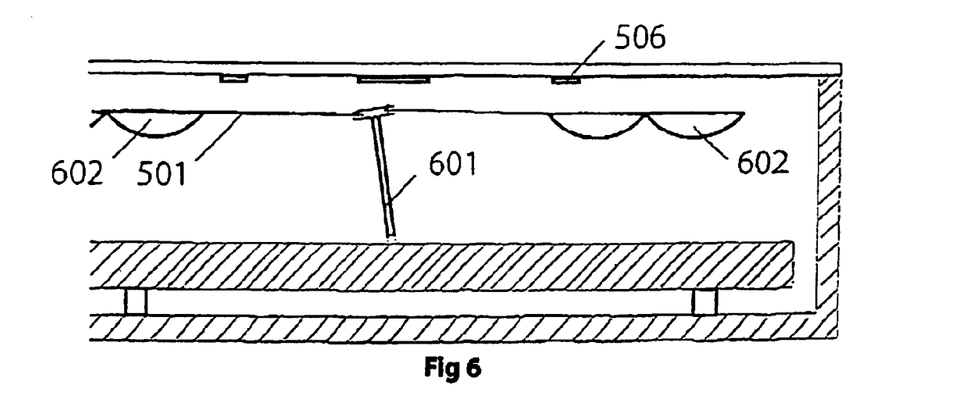
FIG. 6 shows a side view of the displacer in FIGS. 5a and 5b connected to a lens arrangement.

FIG. 6 shows a schematic side view of a two dimensional displacer according to an embodiment of the invention having a lens arrangement and employing the disc and shield shown in FIGS. 5a and 5b. Like details are denoted with same numerals. The shield 506 is arranged above the disc 501. The tongues engage a lever 601, which transmutes the movement of the tongues into a movement of the disc 501. At the edges of the disc 501 is a lens arrangement 602 arranged and schematically shown. Thus, the movement of the tongues is transmitted to movement of the lens arrangement 602.

Figure 7A:
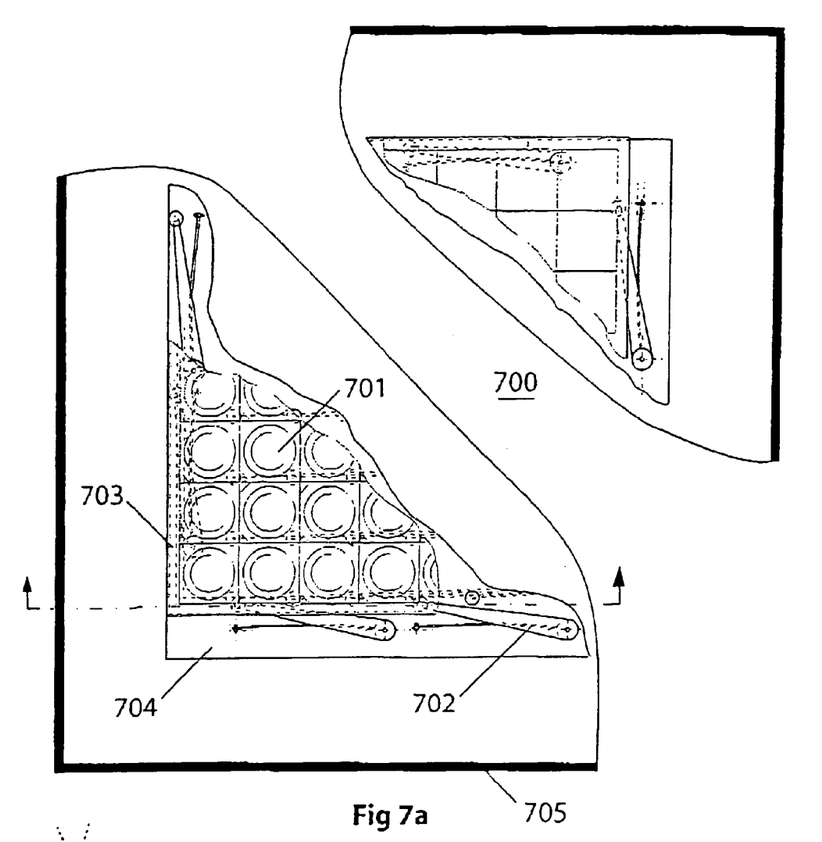
FIGS. 7a and 7b shows a top and a side view of a sunlight collecting device according to an embodiment of the invention comprising a multitude of convex lenses.
Figure 7B:
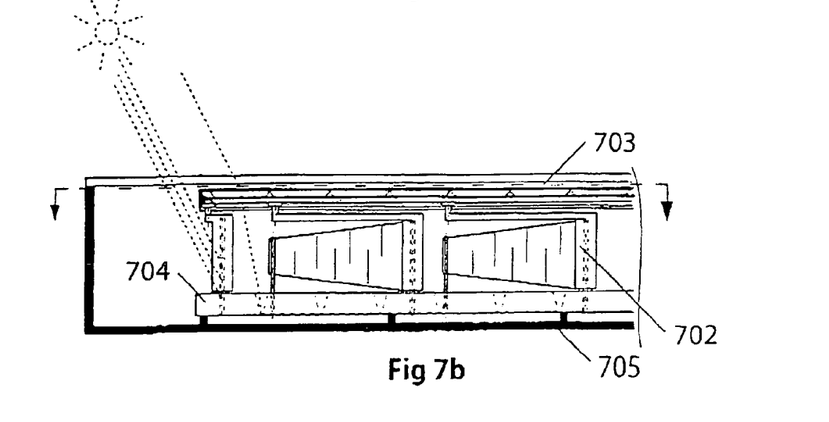

FIG. 7a shows a part of a sunlight collecting arrangement 700 comprising a multitude of convex lenses 701 in top view according to an embodiment of the invention having several bi-metal actuators 702 arranged on each side. The sunlight collecting arrangement comprises a top plate 703 and a bottom plate 704 arranged in a box 705 having transparent top and sides. The bottom plate 704 comprises concave lenses focusing the collected sunlight into optical fibers for transmission to an illumination arrangement (not shown). The top plate 703 comprises the convex lenses 701 and is movably arranged in relation to the bottom plate 704 as will be described in greater detail below. FIG. 7b shows the arrangement in FIG. 7a in side view.

Sunliqht collecting panels, such as the arrangement shown in FIG. 7 can be used on roofs, on the facings of a building, on noise protections at roads etc. They may even be visually usable as means of expression in architecture. The panels could for instance be made semitransparent and be used as protection against direct sunlight, which is directed away into light transmission fibers, but let through indirect sunlight for illumination purpose.

The panels could also be used for animations, information and commercials. If the panel is viewed from the top side 703 a very much enlarged picture of the bottom plate 704 is seen. If the bottom plate is colored with dots in a repetitive pattern the color of the panel will change as the viewer change position in relation to the panel. If the panel is viewed from a fixed point the panel will change color depending on the position of the sun depending on that the top plate 703 follows the movement of the sun. By skillfully selecting the color and position of the dots on the bottom plate 704 a moving viewer, such as one traveling by car, would get the impression of for instance an animation. If the panel is designed in a semitransparent material it could be lit at night to display its message.

The size of the panels can be between 50 mm, and 3000 mm preferably 600 mm. They can be hexagonal with the distance between opposite parallel sides between 50 mm and 3000 mm, preferably 600 mm. If the panels are rectangular they may have sides up to 2 meters and down to 50 mm. The thicknesses of the panels are manly depending on the focal distance and size of the lenses, possibly between 5 mm and 300 mm, preferably 30 mm. To be able to completely cover a surface, "dummy" panels of similar structure and color can be used, which do not collect sunlight but otherwise look like a sunlight collecting panel.

Figure 8A:
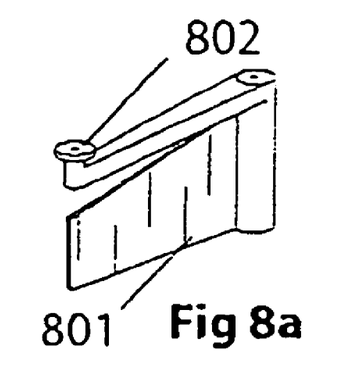
FIGS. 8a, 8b and 8c shows a bi-metal actuator according to an embodiment of the invention in three different positions.
Figure 8B:
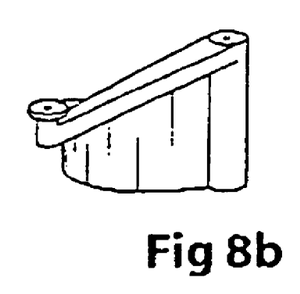
Figure 8C:
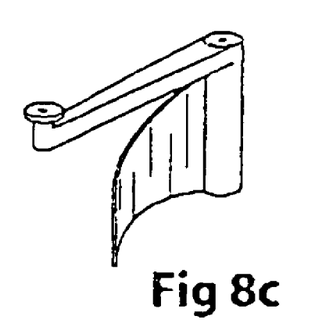

FIGS. 8a to 8c shows bi-metal actuator 702 in three different configurations. The actuator 702 is affected by the incident sunlight and a bi-metal tongue 801 change position in dependence of said incident sunlight as can be seen in the figures. The tongue 801 is coupled to the bottom plate 704 and a coupling means 802 is coupled to the top plate 703, as will be described in more detail below. Thus, when the tongue change position the relative position between the top and bottom plates 703 and 704 will also change.

Figure 9:
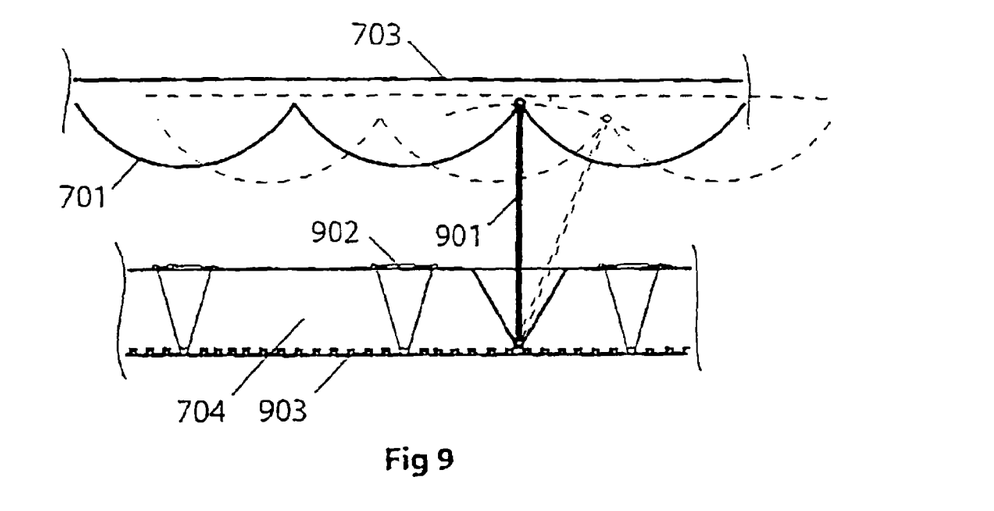
FIG. 9 is a detail of the embodiment in FIG. 7 showing the coupling between the concave lenses, the optical fibres and the convex lenses.

FIG. 9 shows an enlarged detail of FIG. 7. The coupling between the top plate 703 and the bottom plate 709 is partly arranged by the bi-metal actuators 702 and partly by a number of rods 901. The rods 901 are arranged in conical recesses in the bottom plate 704 and between the convex lenses 701 in the top plate 703. As can be seen the top plate 703 will have a two dimensional freedom of movement along a spherical surface. In FIG. 9 also the concave lenses are shown 902 as well as optical fibers 903 detailed in relation to FIG. 10.

Figure 10:
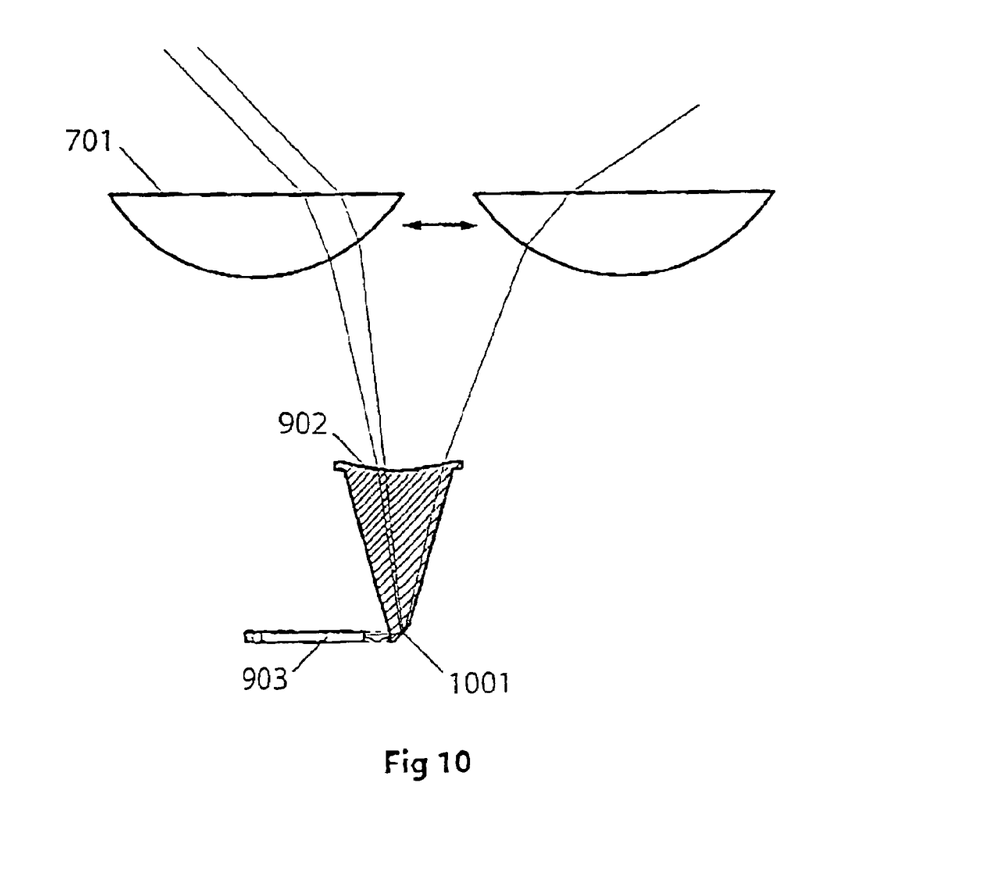
FIG. 10 shows a schematic diagram of a sunray path through a lens arrangement.

FIG. 10 shows a schematic diagram over the sun ray oath through the convex lens 701, the concave lens 902 to a reflective surface 1001 and in to the light carrying optical fiber 903 for further transmission to a light emitting device (not shown). The reflective surface may be planar or may be somewhat curved to reflect the light into the optical fiber 903. The presence of the reflective surface allows for design of a thinner panel.

Figure 11A:
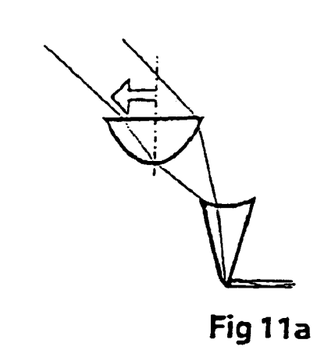
FIG. 11a to 11e shows different arrangements of convex and concave lenses.
Figure 11B:
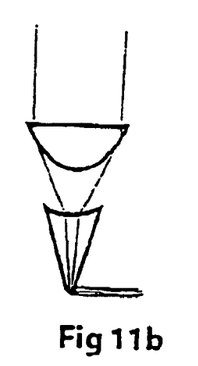
Figure 11C:
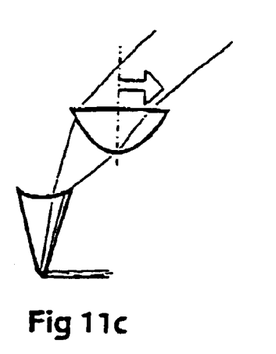
Figure 11D:
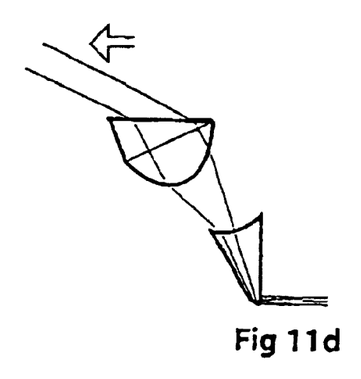
Figure 11E:
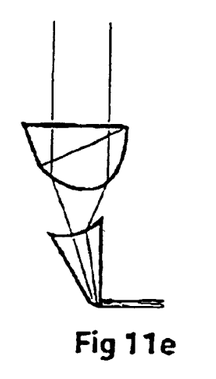

FIG. 11a to 11c shows a lens arrangement suitable when the sunlight collection arrangement 700 is horizontally positioned and the sun is in zenith. However, it might be beneficial to position the collection arrangement 700 on a roof with an angle to the horizontal plane or even on a wall substantially vertically. Then the sunlight will have an angle of incidence, which need to be considered. FIGS. 11d and 11e shows a lens arrangement suitable for an arrangement where the collection arrangement 700 is positioned with an angle in relation to the horizontal plane. As can be seen the arrangement in FIG. 11d can handle light with a greater angle of incidence. Preferably the sunlight collection arrangements 700 may be manufactured in a couple of different configurations suitable for placement with different angles in relation to the horizontal plane, for instance 0 degrees, 35 degrees, 70 degrees and 90 degrees. The angles may be selected to agree with common roof angles for the specific market.

Figure 12:
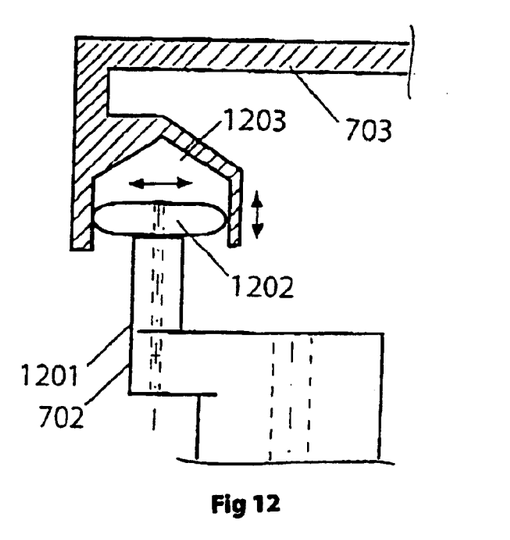
FIG. 12 is a detail of the embodiment in FIG. 7 showing the coupling between the bi-metal actuator and the arrangement of convex lenses.

FIG. 12 shows an enlarged portion of the embodiment depicted in FIG. 7 in greater detail. A extending portion 1201 of the bi-metal actuator 702 comprises a friction reducing means 1202, such as a roller, bearing or the like, which is situated in a recess 1203 in the top plane 703. Since the top plane 703 moves along a spherical surface, as described earlier, the top plane 703 will move slightly up and down when the bi-metal actuator 702 moves the ton plane 703. Hence, the recess 1203 is deep enough to allow for the extending portion 1201 during the complete movement. The friction reducing means 1202 may comprise rollers in both vertical and horizontal direction even though only horizontal is shown in the figure.

Figure 13:
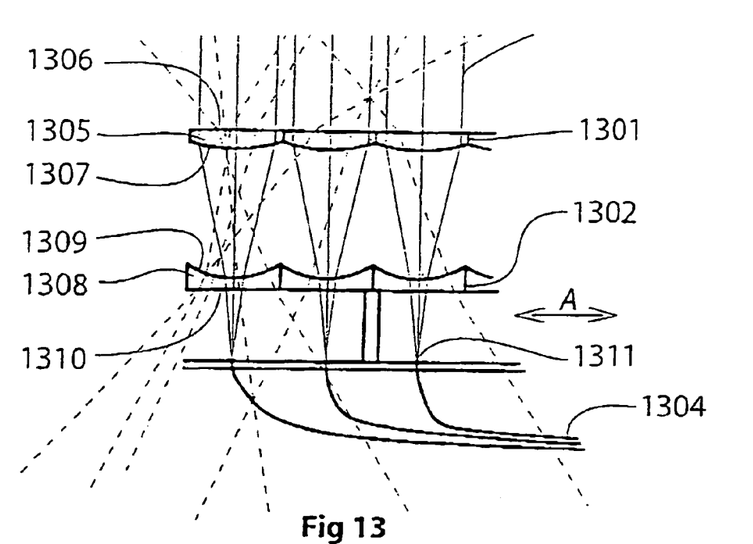

FIG. 13 shows a part of a first sheet of lenses 1301 and a part of a second sheet of lenses 1302 with the first sheet 1301 arranged above the second sheet 1302. The second sheet 1302 of lenses is movable in a direction A to collect direct 1303 sunlight and focus said direct sunlight on light transportation means, in this embodiment fibers 1304. Ambient, or indirect light is schematically shown in FIG. 13 with dotted lines, and as can be seen in the figure is allowed to pass through the arrangement.

Each lens 1305 in the first sheet of tenses 1301 comprises a first substantially flat surface 1306 and a second convex surface 1307. Each lens 1308 in the second sheet of lenses 1302 comprises a third concave surface 1309 and a fourth substantially flat surface 1310. The two sheets together form a light propagation arrangement, which is specifically suitable to collect direct sunlight and focus said light on a specific position or point 1311. The arrangement need not adjust the spacing between the two sheets 1301 and 1302. The collected light is focused on points 1311 on the plate 1312 which is fixed relative the second sheet of lenses. Thereby, the sheets of lenses 1301 and 1302 only need to be movable along a flat plane in relation to each other.

Figure 14:
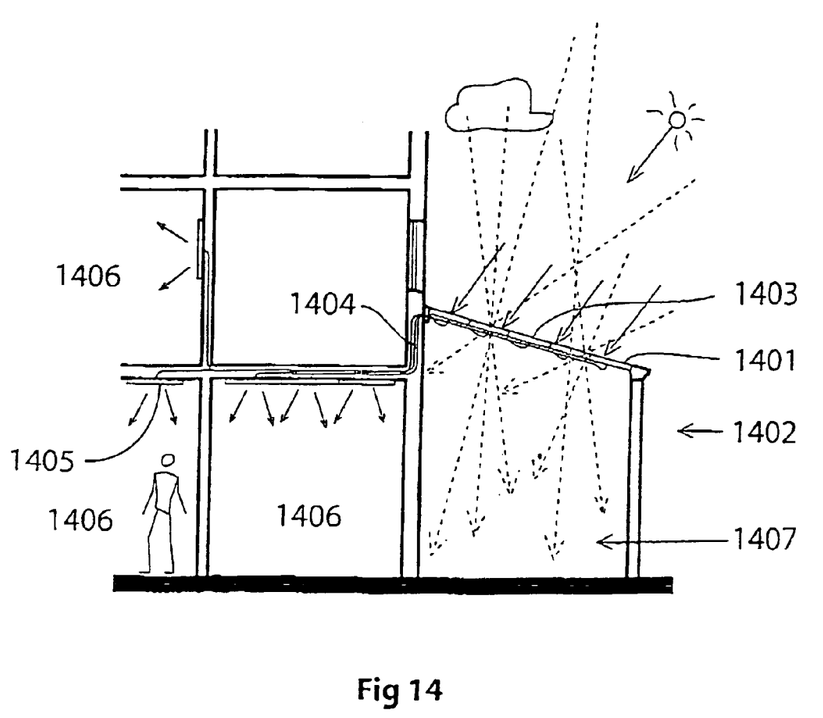
FIG. 14 shows a number of panels according to the first aspect of the invention mounted on a building, allowing ambient light into a first room and collecting direct sunlight.

FIG. 14 shows a schematic drawing of panels 1403, comprising the lens arrangement disclosed in FIG. 13, mounted on a roof or facade or as a part of a roof or facade or as a sunshield 1401 on a building 1402. Direct sunlight is shown with straight arrow lines and ambient light is shown with dotted arrow lines. The panels 1403 collect direct sunlight, which is transported through fibers 1404 to light emitting devices 1405 located in inner rooms 1406 in the building 1402. Ambient light passes through the panels 1403 into the room 1407, which thus is lit with a comfortable natural light.

Figure 15A:
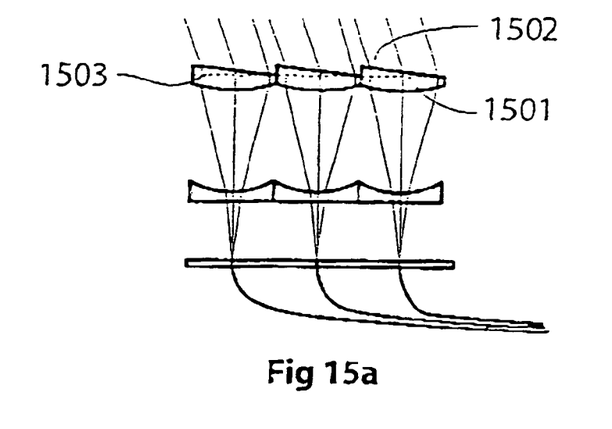
FIGS. 15a to 15c shows schematic side views of preferred embodiments according to the present invention where prisms are used to change the preferred angle of incident light.
Figure 15B:
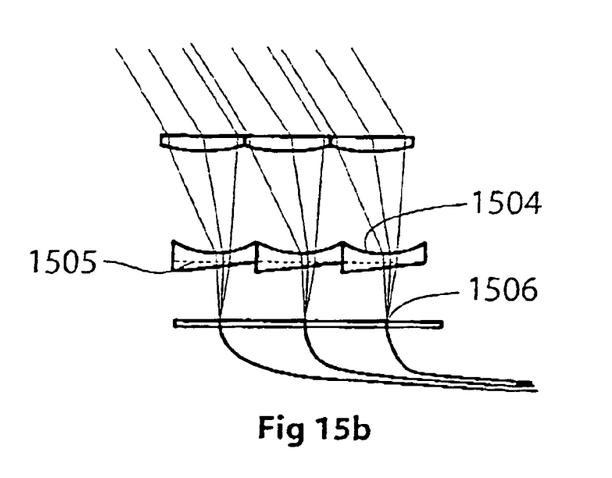
Figure 15C:
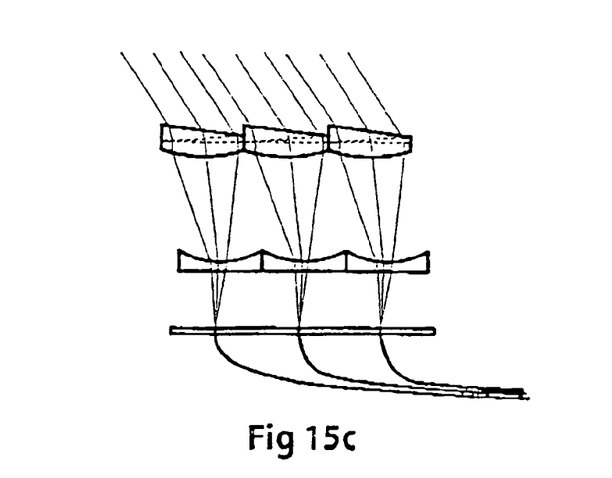

FIGS. 15a to 15c schematically shows different embodiments according to the present invention involving prisms to increase the preferred angle of incident sunlight. The embodiment without prisms would show best performance if positioned perpendicular to the incident direct sunlight. That is on the equator directly flat on the ground and on other latitudes with a corresponding angle to the ground. If positioned otherwise the direct sunlight do not fall perpendicular on the lens arrangement reducing the performance of the apparatus. To counteract this prisms, or functionally equal elements, are incorporated into the arrangement.

FIG. 15a shows a first sheet of lenses 1501 where each lens comprises a prism part 1502 to refract the incident sunlight so when the incident sunlight reaches the first surface 1503, indicated with dotted lines, it is in fact perpendicular to said surface. The prism part 1502 is actually a part of the lens 1501 and is not a separate item.

FIG. 15b shows the prisms located on the second sheet of lenses 1504 to refract the sunlight coming out from the fourth surface 1505, indicated with dotted lines, on the collection points 1506.

FIG. 15c shows two sets of prisms on the lower concave lens to improve the efficiency in certain situations and to further increase the effective receiving angle for incident light.

Figure 16:
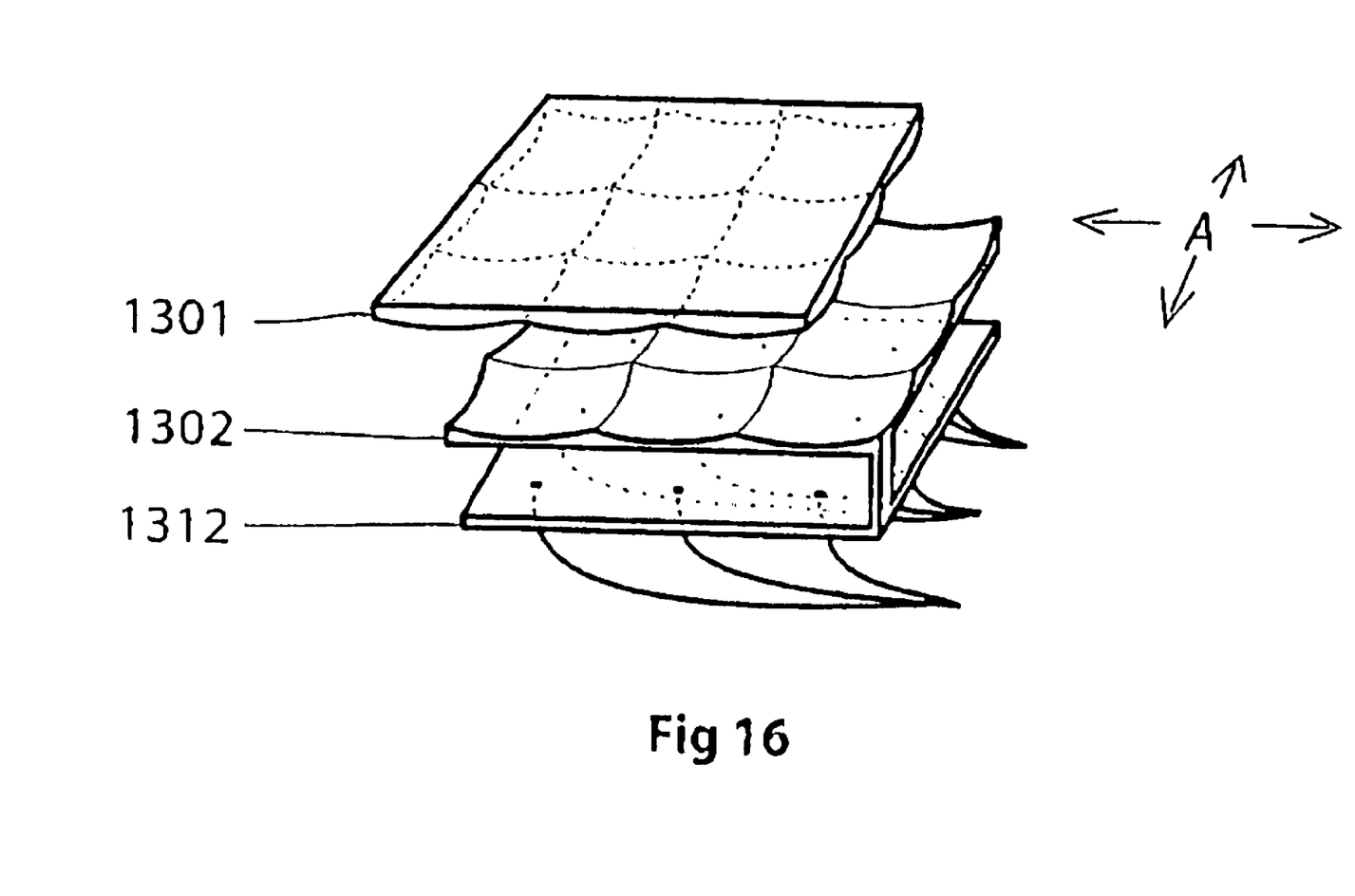
FIG. 16 shows a perspective view of the arrangement in FIG. 13.

FIG. 16 shows a perspective view of the inventive arrangement disclosed in FIG. 13.

It will be obvious that the invention may be varied in a plurality of ways. Such variations are not to be regarded as a departure from the scope of the invention. All such modifications as would be obvious to one skilled in the art are intended to be included within the scope of the appended Claims.

The invention claimed is:

1. A panel for mounting on a building comprising a solar ray collecting device, said panel is further arranged to be substantially transparent to a substantial part of the indirect, or ambient, light so that said panel, when mounted on a building, allows ambient light into said building and collects direct sun light falling on said panel, said solar ray collecting device is arranged to collect a substantial part of the direct sun light falling on said panel and direct said collected sun light on a light transportation means or a light transformation means, said solar ray collecting device is a lens arrangement having optical lenses for focusing said direct sunlight onto said light transportation means or light transformation means, and wherein said lenses in said lens arrangement is provided to allow ambient daylight to pass said panel to lit a space in said building with a natural light, wherein, said lens arrangement comprises, in light propagating direction, first lenses arranged side by side having first substantially planar surfaces and second convex surfaces, second lenses arranged side by side having third concave surfaces and fourth substantially flat surfaces so that direct sunlight passes first, second, third and fourth surfaces in said order, and said first and second lenses are displaceable in relation to each other in at least a first direction.

2. The panel according to claim 1, wherein said light transportation means is a light conducting fiber.

3. The panel according to claim 1, wherein said light transformation means is a light to electricity conversion means e.g. a fotodiod.

4. The panel according to claim 1, wherein said panel comprises, in light propagation direction, a transparent top side and a transparent bottom side connected at the sides to form a box, said box encloses a lens arrangement for collecting direct sun light.

5. The panel according to claim 1, wherein at least one of said first and/or second lenses are displaceable along a straight plane parallel to said top and bottom sides.

6. A solar panel system comprising the panel of claim 1 and a mechanical displacing device for moving an object, such as a lens, in dependence of the sun's position in the sky, including, a solar ray shield having at least one aperture, at least a first solar ray sensitive tongue, such as a bimetal or memory alloy tongue, arranged at least partly under said at least one aperture in the direction of incident solar rays, an actuator rod coupled to said solar ray sensitive tongue and arranged to displace said solar ray shield and/or said solar ray sensitive tongue in relation to each other in dependence of the incident angle of solar rays.

7. The mechanical displacing device according to claim 6, wherein said displacing device comprises at least two solar ray sensitive tongues arranged parallel with each other under said aperture in the direction of incident solar light, said at least two solar ray sensitive tongues are coupled to said actuator rod so as to force said actuator rod to move said solar ray shield and/or said at least two solar ray tongues in relation to each other to achieve an equilibrium.

8. The mechanical displacing device according to claim 6, wherein said actuator rod is arranged to displace said solar ray shield and/or said at least two solar ray tongues in relation to each other in a east-west direction.

9. The mechanical displacing device according to claim 6, wherein said actuator rod is arranged to displace said solar ray shield and/or said at least two solar ray tongues in relation to each other in a south-north direction.

10. The mechanical displacing device according to claim 9, wherein said displacing device comprises four solar ray sensitive tongues coupled to said actuator rod so as to force said actuator rod to move said solar ray shield and/or said four solar ray tongues in relation to each other in a first and a second direction.

11. An apparatus for collecting sunlight having a solar ray collecting device, comprising a first set of lenses arranged in arrays side by side to form a first sheet of lenses, a second set of lenses arranged in arrays side by side to form a second sheet of lenses, means for moving said first and second sheet of lenses in relation to each other, said first and second sheet of lenses is movable with relation to each other substantially only along a substantially flat plane so that the distance between said first and second sheet is kept constant to thereby focus said sunlight onto a light transportation means or a light transformation means, wherein each of said lens in said first set of lenses comprises a first substantially flat surface and a second convex surface, each of said lens in said second set of lenses comprises a third concave surface and a fourth substantially flat surface, and incident light passes through said lens arrangement through said first, second, third and fourth surface in that order.

12. The apparatus according to claim 11 for collecting and transmitting sunlight into a space comprising a solar light transmitting device and a solar light emitting device, wherein said solar ray collecting device is arranged to collect sunlight and direct said sunlight to said solar light transmitting device, said solar ray transmitting device is arranged to transmit said sunlight from said solar ray collecting device into said space and to said solar light emitting device, and said solar light emitting device is arranged to emit solar light in said space, wherein at least one of said first and/or second sheet is arranged to be movable in dependence of the angle of incident solar light so as to focus the solar light onto said solar light transmitting means through said convex and concave lens.

13. The apparatus according to claim 11, wherein said first and/or second sheet is movable in a first direction corresponding to the direction of the sun's movement over the sky during a day.

14. The apparatus according to claim 11, wherein said first and/or second sheet is movable in a second direction corresponding to the sun's height over the horizon.

15. The apparatus according to claim 11, wherein said movement of said first and/or second sheet is achieved through a displacing device wherein said displacing device comprises solar ray sensitive means arranged to detect the position of the sun in the sky and actuating means arranged to move said convex and/or concave lens in dependence of the detected sun position.

16. The apparatus according to claim 15, wherein said actuating means is an electric motor.

* * * * *